United States Patent [19]

Thomas

[11] 4,398,750

[45] Aug. 16, 1983

[54] EMERGENCY RELEASE MECHANISM FOR PASSIVE SEAT BELT SYSTEMS

[75] Inventor: Rudy V. Thomas, Sterling Heights, Mich.

[73] Assignee: Allied Corporation, Morris Township, Morris County, N.J.

[21] Appl. No.: 313,006

[22] Filed: Oct. 19, 1981

[51] Int. Cl.³ ............................................ B60R 21/10
[52] U.S. Cl. .................................... 280/802; 280/808
[58] Field of Search ............... 280/802, 808, 803, 804; 24/265 EC, 248 B

[56] References Cited

U.S. PATENT DOCUMENTS

| | | | |
|---|---|---|---|
| 3,865,397 | 2/1974 | Pilhall et al. | 280/803 |
| 4,159,834 | 7/1979 | Miller et al. | 280/802 |
| 4,324,418 | 4/1982 | Stephenson | 280/802 |

*Primary Examiner*—Robert R. Song
*Attorney, Agent, or Firm*—Roger Criss; James P. DeClercq

[57] ABSTRACT

An emergency release mechanism for passive seat belt systems including a housing retained in the window frame of a vehicle door, a pivotable lever in the housing about which a loop of seat belt webbing is placed, a latch normally holding the lever in its lock position and a release member for movement of the latch out of engagement with the lever in order to release the belt.

10 Claims, 3 Drawing Figures

EMERGENCY RELEASE MECHANISM FOR PASSIVE SEAT BELT SYSTEMS

DESCRIPTION

BACKGROUND OF THE INVENTION

1. Field of the Invention

This invention relates to passive seat belt systems and in particular to mechanisms for emergency release from such systems.

2. Description of the Prior Art

It has been recognized as being desirable to provide an emergency release mechanism for a passive seat belt system. Various such devices have heretofore been proposed, such as those described in U.S. Pat. No. 4,159,834 to Miller et al. The prior art devices have generally been of the buckle and tongue type and include a rather bulky buckle extending from the door frame. It would be desirable to provide an emergency release mechanism which reduces the amount of the material extending from the door frame and operated in a relatively simple manner and yet was economical.

SUMMARY OF THE INVENTION

In accordance with this invention, there is provided in a passive seat belt system including a seat belt adapted to automatically be positioned about an occupant in a seat in a vehicle, the seat being located adjacent to a door of the vehicle, the seat being normally attached to the door, and an emergency release means for releasing the seat belt from the door to permit egress of the occupant from the vehicle in an emergency situation, the improvement comprising:

the emergency release means comprising:

a housing mounted on the door;

a retaining lever pivotally mounted in the housing and adapted to communicate with the seat belt, the lever being movable from a first position at which it retains the seat belt in its operative mode to permit automatic positioning about the occupant, to a second position at which it releases the seat belt;

latch means in the housing normally located at a first position at which it holds the lever in its first position, the latch means being movable in the housing to a second position at which it no longer holds the lever in its first position;

means automatically moving the lever from its first position to its second position upon movement of the latch to its respective second position; and actuator means supported in the housing and in contact with the latch means, the actuator means being movable from a first lock position to a second release position, movement of the actuating means from its first to second positions resulting in movement of the latch means from its first to second positions whereby the lever is moved to its second position to release the seat belt.

Preferably, the housing is mounted within the window frame of the door with the only portion of the mechanism extending inward from the door being a release lever acting as the actuator means. Preferably, a loop of webbing is provided at the end of the seat belt adjacent the door and this loop extends over the retaining lever. A single latch bears against the retaining lever and is in contact with the release lever. The latch is movable in slots in the housing away from the retaining lever upon pivoting of the release lever to free the retaining lever. Also, the retaining lever is preferably spring biased so that it moves to its release position upon actuation of the release lever whereby the loop of webbing either automatically slides off the retaining lever or is in position to be easily lifted off such lever to provide emergency escape from the vehicle.

DESCRIPTION OF THE PREFERRED EMBODIMENTS

Figure 1:
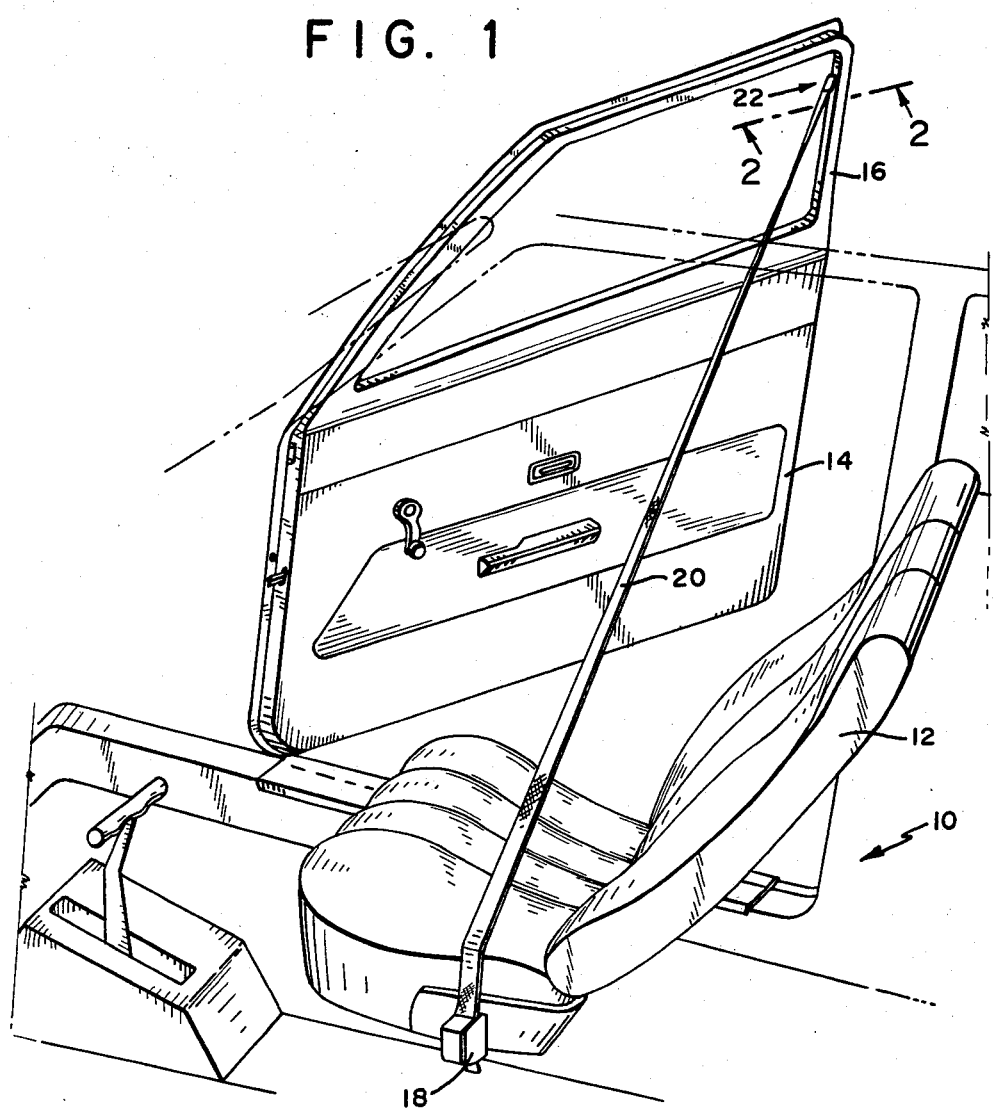
FIG. 1 is a view of the passive seat belt system of this invention.

With reference to FIG. 1, there is shown a passive seat belt system, generally indicated at 10, in a vehicle having a seat 12 for an occupant and a door 14 adjacent to seat 12. Door 14 includes a conventional window frame including a vertical post 16. A conventional seat belt retractor 18 is mounted to the vehicle on the inboard side of seat 12. Seat belt webbing 20 is wound up on retractor 18 and extends therefrom towards door 14. The free end of webbing 20 is attached to an emergency release mechanism 22 mounted on post 16.

Figure 2:
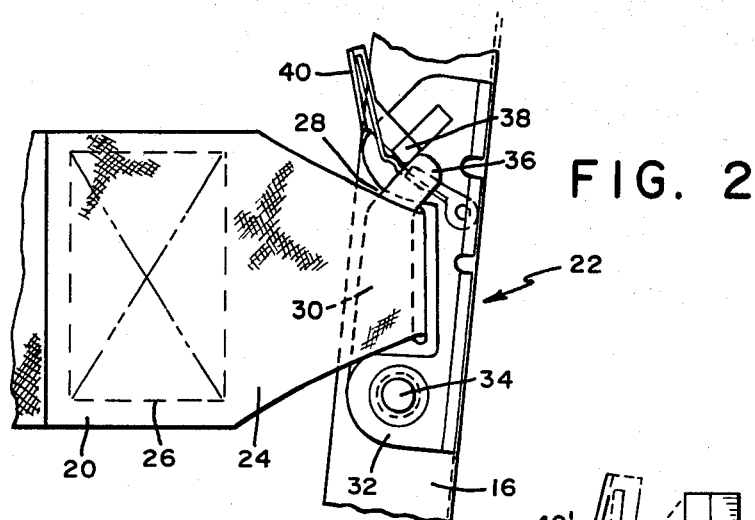
FIG. 2 is a view of the emergency release mechanism of this invention taken along line 2—2 of FIG. 1.

Referring particularly to FIG. 2, the free end of webbing 20 is folded over itself into a loop 24 and is retained in that form by means of stitching 26. Loop 24 extends through slotted opening 28 in post 16 and extends over a pivotable lever 30. Lever 30 is mounted on a shaft 34 extending through a first end 32 of the lever. Lever 30 extends generally vertically from end 32 and includes an angled portion which terminates in a distal end 36. End 36 is in abutment with a rectangular shaped latch 38 which in turn is controlled by a release lever 40, which extends into the interior of the vehicle a slight distance from the surface of post 16.

Figure 3:
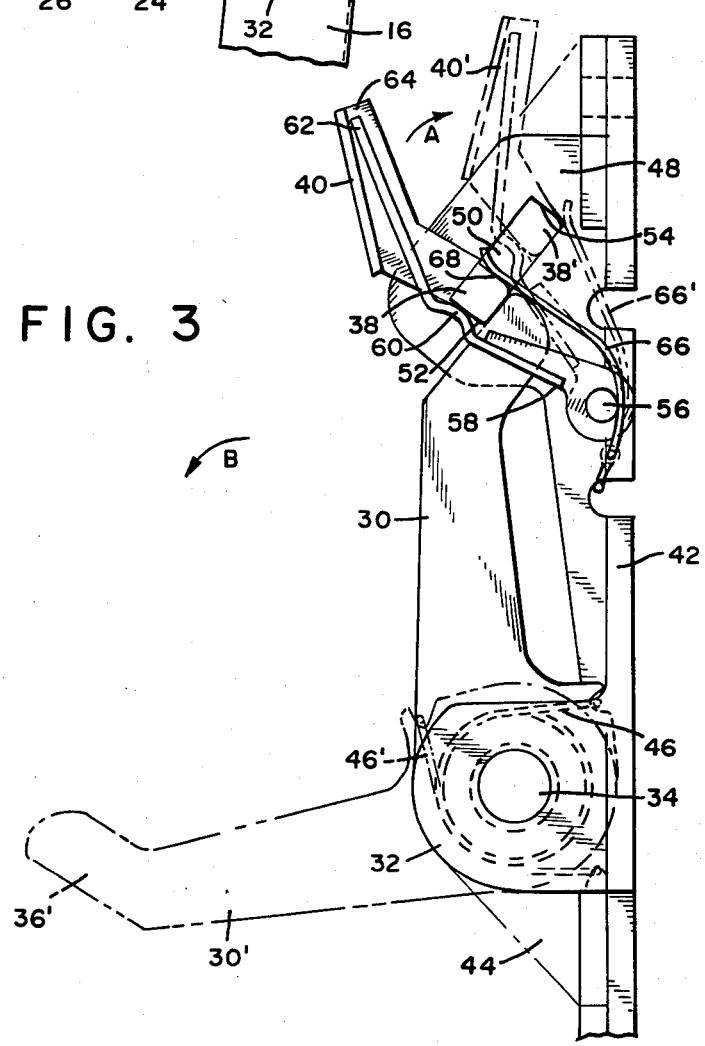
FIG. 3 is an enlarged view of the emergency release mechanism of FIG. 2, with the seat belt being not shown for ease of understanding.

Referring now to FIG. 3, parts shown in solid line represent the normal condition of mechanism 22 and those in dotted line the release position, also indicated by prime numerals. Emergency release mechanism 22 includes a frame 42 having an upstanding U-shaped flange 44 on its lower position which supports shaft 34. Coil spring 46 is provided about shaft 34 and normally biases lever 30 to its release position indicated at 30'. Adjacent the upper portion of frame 42 is another U-shaped flange 48. Frame 42 is suitably affixed to post 16 by means not shown.

Flange 48 includes rectangular inclined slots 50 having lower ends 52 and upper ends 54; only one of these slots 50 is shown in the drawings. Latch 38 extends between the slots 50 and flange 48 and has a generally square shaped cross-section. Also mounted between the legs of flange 48 is a shaft 56 on which is pivotally supported release lever 40. Release lever 40 has one end 58 in communication with shaft 56, an intermediate raised section 60 and a distal end 62 which is captured within a cap 64 that is adapted to be grasped manually. Leaf spring 66 is mounted on frame 42 and its free end portion 68 bears against one face of latch 38, normally urging the latch downwardly towards end 52 of slots 50. The opposite face of latch 38 bears against the raised portion 60 of release lever 40.

In normal operation, loop 24 of webbing 20 is positioned over the central portion of lever 30. Lever 30 is retained in its first, vertical position due to the abutment of latch 38 against its end 36 and unintentional disengagement is prohibited due to the strength of the walls surrounding slots 50 against which latch 38 bears. Latch 38 is also retained in its lower position by means of spring 66. Lever 40 normally assumes its lower position shown in FIG. 3 also due to the bias of spring 66 acting through latch 38.

In order to free webbing 20 from emergency release mechanism 22, release lever 40 is manually rotated in a direction of arrow A (clockwise in FIG. 3) against the force of spring 66. Latch 38 is thereby forced upwardly in slots 50 due to its contact with raised portion 60 of lever 40, until the latch has moved sufficiently upwards that it no longer is in contact with end 36 of lever 30. When lever 30 is thus freed, the bias force of spring 46 rotates lever 30 in the direction of arrow B (counterclockwise in FIG. 3) to a position slightly below the horizontal. As a result, loop 24 of webbing 20 may slide off lever 30 (especially due to the inclined surfaces of the lever) and the webbing is wound up on a retractor 18, thereby freeing the occupant. Should loop 24 not free itself from lever 30, it may very easily be manually lifted off of the lever to be wound up by retractor 18. In order to again provide an effective passive seat belt system, loop 24 of webbing 20 is looped about lever 30 and lever 30 is rotated upwardly to a vertical position at which latch 38 retains end 36 of lever 30 as described above.

It can be seen that the present invention provides a simple yet effective emergency release mechanism for a passive seat belt system and includes only a minor portion which intrudes into the passenger compartment of the vehicle. A simple rotating movement of release lever 40 can automatically release the webbing from the emergency release mechanism.

Although in the drawings there is depicted a 2-point type of passive seat belt system, it is to be understood that the present invention may likewise be utilized with a three-point system in which, for example, retractor 18 may be replaced by a direction changing ring and the webbing 20 extending therefrom to a retractor mounted on the lower portion of door 14. It is also to be understood that the end of the webbing 20 need not be directly attached to lever 30 by means of loop 24 since intermediate plastic or metal loops and the like may be provided. Furthermore, it is envisioned that webbing 20 need not terminate at lever 30 but passes therethrough to another anchor position so that lever 30 acts in a manner of a direction changing bracket or D-ring.

I claim:

1. In a passive seat belt system including a seat belt adapted to automatically be positioned about an occupant in a seat in a vehicle, said seat being located adjacent to a door of said vehicle, said seat belt normally attached to said door, and an emergency release means for releasing said seat belt from said door to permit egress of the occupant from said vehicle in an emergency situation, the improvement comprising:
   said emergency release means comprising:
   a housing mounted on said door;
   a retaining lever pivotally mounted in said housing and adapted to communicate with said seat belt, said lever being movable from a first position at which it retains said seat belt in its operative mode to permit automatic positioning about said occupant to a second position at which it releases said seat belt;
   latch means in said housing located at a first position at which it holds said lever in its first position, said latch means being movable in said housing to a second position at which it no longer holds a lever in its first position;
   means automatically moving said lever from its first position to its second position upon movement of said latch means to its second position; and
   actuator means supported in said housing and in contact with said latch means, said actuator means being movable from a first lock position to a second release position, movement of said actuator means from its first to second positions resulting in movement of said latch means from its first to second positions, whereby said lever is moved to its second position to release said seat belt.

2. The passive seat belt system of claim 1 including a window frame on said door, said frame including a post, said housing being recessed in said post.

3. The passive seat belt system of claim 1 including a loop at one end of said seat belt, said loop extending over said retaining lever.

4. The passive seat belt system of claim 1 wherein said actuating means comprises a pivotable lever.

5. The passive seat belt system of claim 1 wherein said means automatically moving said lever from its first to its second positions comprises a spring.

6. The passive seat belt system of claim 1 including inclined slots in said housing, said latch means including a single latch retained in said slots.

7. The passive seat belt system of claim 6 including a spring in said housing biasing said latch downwardly in said slots.

8. The passive seat belt system of claim 7 including a distal end of said lever, said latch normally bearing against said distal end to retain said lever in its first position.

9. The passive seat belt system of claim 1 including a seat belt retractor mounted on the inboard side of said seat, said seat belt being wound up on said retractor.

10. The passive seat belt system of claim 2 wherein said actuator means comprises a pivotable lever mounted in said housing, said pivotable lever having a distal end portion adapted for manual actuation, and wherein the only portion of said emergency release means that extends inwardly from said post is said distal end portion of said lever.

* * * * *